(12) United States Patent
Roylance et al.

(10) Patent No.: US 7,142,316 B2
(45) Date of Patent: Nov. 28, 2006

(54) SUPPORTING MULTIPLE PRINT ENGINE CONFIGURATIONS THROUGH COMPATIBLE DELAY WINDOW STORAGE MODES

(75) Inventors: Eugene A. Roylance, Boise, ID (US); John H. Harris, Boise, ID (US); Marc L. Warner, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 855 days.

(21) Appl. No.: 10/150,804

(22) Filed: May 16, 2002

(65) Prior Publication Data

US 2003/0214668 A1    Nov. 20, 2003

(51) Int. Cl.
*G06F 15/00* (2006.01)
(52) U.S. Cl. .................... 358/1.13; 358/1.16
(58) Field of Classification Search ............. 358/1.1, 358/1.8, 1.9, 1.13, 1.15, 400, 448, 1.16
See application file for complete search history.

(56) References Cited

U.S. PATENT DOCUMENTS

| | | | | |
|---|---|---|---|---|
| 5,301,336 | A * | 4/1994 | Kodosky et al. | 715/846 |
| 5,623,592 | A * | 4/1997 | Carlson et al. | 715/866 |
| 6,129,457 | A * | 10/2000 | Thompson et al. | 358/1.2 |
| 6,344,901 | B1 * | 2/2002 | Simon et al. | 358/1.9 |
| 2003/0214537 | A1 * | 11/2003 | Lynn | 345/835 |

* cited by examiner

*Primary Examiner*—Gabriel Garcia (57) ABSTRACT

The system, methods and hardware described herein relate to processing raster data on an EP (electrophotographic) process printing device. A hardware ASIC supports multiple EP print engine configurations through a common delay window block that presents a variable two-dimensional view of raster data formatted in a consistent manner that is compatible for processing by various enhancement blocks. Benefits of the disclosed system, methods and hardware include decreased development costs for EP printers due to a reduced need to design, test, and manufacture different ASICs for numerous EP print engine configurations.

33 Claims, 8 Drawing Sheets

Fig. 10

SUPPORTING MULTIPLE PRINT ENGINE CONFIGURATIONS THROUGH COMPATIBLE DELAY WINDOW STORAGE MODES

TECHNICAL FIELD

The present disclosure relates to printing, and more particularly, to providing compatible storage modes within an image data delay window to support multiple print engine configurations.

BACKGROUND

Current electrophotographic (EP) process printers (i.e., laser printers) allow users to select (e.g., through a printer driver interface) a print mode that determines the resolution (i.e., dpi or dots per inch) and bit-depth (i.e., bits per pixel) of print jobs sent to a printer. For example, by selecting a print command from within an application program, a user can typically make print quality selections through a printer driver interface. The options may include, for example, "ProRes", "FastRes", and "600 dpi". "ProRes" may provide 1200 dpi, 1 bit per pixel data, while "FastRes" may provide 600 dpi, multi-bit (e.g., 2, 4, or 8 bits) per pixel data. Thus, selection of a print mode causes a print job to be "RIP"'ed (i.e., raster image processed) or "rasterized" to a certain resolution (both horizontal and vertical) and bit-depth based on the print mode selection. The printer driver typically formats the print job in a page description language (PDL) which is then rasterized to an appropriate resolution and bit-depth on the printer.

Various algorithms are implemented in a printer ASIC (application specific integrated circuit) through image enhancement blocks that further process the rasterized data into pulse width modulation codes (Pcodes) to modulate a laser on and off as it scans an electrophotographic drum. The enhancement blocks are made up of logic gates capable of processing the rasterized data in real time. The enhancement blocks may include, for example, a REt (Resolution Enhancement technology) block, a PhotoTone block, a Res-Double block, a NEM (native enhancement mode) block, and so on. In addition to generating Pcodes to drive a laser modulation circuit, the enhancement blocks also typically perform some type of adjustment to the image data such as a smoothing or filtering function.

Moreover, each enhancement block typically processes a particular type of data, and therefore expects to see raster data in a particular format. For example, RET processes black and white data and therefore wants to see raster data formatted with a bit-depth of 1 bit per pixel. PhotoTone, however, is a half-toning algorithm used for processing gray scale images. It therefore expects to see raster data formatted in a multi-bit per pixel bit-depth.

The different data format requirements for each enhancement block present a problem of how to provide raster data in a suitable bit-depth for each block. In the past, this problem has been addressed by printer ASICs that provide multiple, two-dimensional windows (each with their own configuration) that are alternately enabled to present an appropriate view of raster data to a given enhancement block. Thus, an enhancement block that needs to process single bit per pixel data will view a window that provides only single bit per pixel data, while an enhancement block that processes multi-bit per pixel data will view a window that provides only multi-bit per pixel data. However, this approach becomes difficult when more than one or two configurations are needed. In addition, this approach requires multiplexing around the RAM in the ASIC, which creates critical timing issues and makes the ASIC more difficult to design.

The problem is further complicated by the fact that the enhancement blocks need to generate Pcode data in a certain format for the laser driver circuits (i.e., pulse width modulators). The laser drivers have requirements that are defined by the laser configuration and native resolution of the print engine. For example, some print engines have lasers that draw 1200 dpi lines in raster order, while others draw 600 dpi lines. Other resolutions are possible, but not currently common. Because the laser drivers are able to generate laser modulations with very fine horizontal resolution, input data having a lower resolution is typically converted into an equivalent higher resolution data for processing by the enhancement blocks. The laser drivers can then run at a set resolution regardless of the resolution of the input data. Thus, variations in horizontal resolutions of the input data are typically not a problem.

However, various print engines may have 1, 2, or more parallel laser beams being driven concurrently. This creates a problem regarding the vertical size (resolution) of the lines of raster data that the lasers are drawing out. The amount of raster data being drawn out or consumed by the lasers must be equivalent to the amount of raster data being read in and processed by the printer ASIC. The measure of the data is based on the area (e.g., in square inches) that the data covers. For example, the amount of data in one line of 300 dpi raster being read in is equivalent to an amount of data in two lines of data being drawn out or consumed by a dual 600 dpi laser configuration. One pass of the dual laser draws out two lines of data, each covering $\frac{1}{600}^{th}$ of an inch, which is equivalent to the single $\frac{1}{300}^{th}$ of an inch line of raster data being read in. If the input data resolution were 600 dpi, two lines of raster data would need to be read in to accommodate each pass of the dual 600 dpi laser configuration. Regardless of the data resolution and the print engine configuration, however, the amount of raster data being consumed must be equivalent to the amount of raster data being input.

In previous printers, these complications were addressed by developing a new ASIC design for each new printer engine configuration. Thus, a particular ASIC might be designed to accommodate several input data modes as described above, but would be limited to functioning with a specific printer engine configuration. In addition to the problems of limited data input modes and the need to design a new ASIC for each new engine configuration, this approach ignores the problem of how to support a data format mode that was not apparent at the time the printing device was defined and the ASIC was designed. Furthermore, previous approaches have the additional problem of being difficult to debug due to a significant number of RAM mappings that make tracking simulations problematic.

Accordingly, the need exists for a way to process printable data having various data formats through various enhancement functions for printing in an electrophotographic process printer having various engine configurations.

SUMMARY

Storage modes for an image data delay window are set based on the format of incoming raster data and a print engine configuration.

In a particular embodiment, an ASIC (application specific integrated circuit) configured to process data in an EP (electrophotographic) process printer includes a common delay window block that provides a variable two dimensional view of raster data formatted in a consistent manner that is compatible for processing by various enhancement blocks within the ASIC. The delay window block makes the ASIC adaptable for use in EP printers having a variety of different laser engine configurations and enables the ASIC to process variously formatted raster data through various image enhancement blocks regardless of the printer's engine configuration. The ASIC uses the format of input raster data and the engine configuration of the printer to set up a storage mode for the delay window that meets the processing requirements of the various image enhancement blocks being implemented in the ASIC. The common formatting of data at key locations in the EP print process (i.e., raster data input to the ASIC, RAM data storage on the ASIC, delay window output from the ASIC) allows for considerable flexibility in supporting print engine and data formats without extreme complexity in the ASIC windowing hardware.

In another embodiment, a storage mode is set for a delay window block based on the format of raster data read into an ASIC, enhancement blocks implemented within the ASIC, and a native resolution and laser configuration of a print engine being driven by the ASIC. The storage mode defines the size of the delay window by the number of rows and columns of raster data (pixels) presented in the window. The storage mode also defines the manner in which the raster data is presented, including the resolution and bit-depth of the raster data.

BRIEF DESCRIPTION OF THE DRAWINGS

The same reference numbers are used throughout the drawings to reference like components and features.

DETAILED DESCRIPTION

The system, methods and hardware described herein relate to processing raster data on an EP (electrophotographic) process printing device. A hardware ASIC supports multiple EP print engine configurations through a common delay window block that presents a variable two-dimensional view of raster data formatted in a consistent manner that is compatible for processing by various enhancement blocks. Benefits of the disclosed system, methods and hardware include decreased development costs for EP printers due to a reduced need to design, test, and manufacture different ASICs for numerous EP print engine configurations.

Because of faster processing speeds, the presently preferred implementation is hardware blocks in an ASIC. Thus, various embodiments will be described with reference to hardware blocks in an ASIC. However, the system and methods disclosed herein may also be implemented through computer/processor-executable instructions such as software or firmware stored on any appropriate computer/processor-readable medium.

Exemplary System Environment for Implementing Common Image Window Hardware

Figure 1:
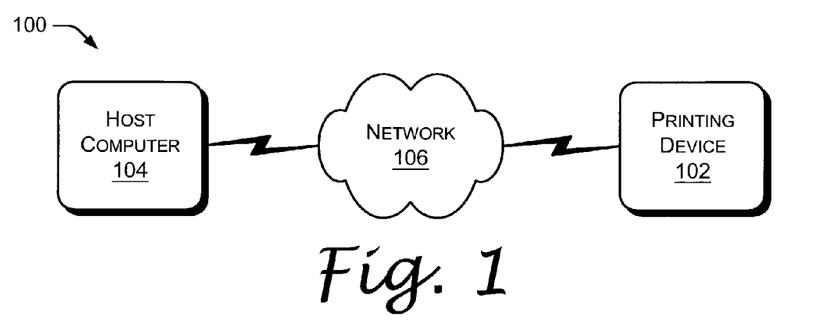
FIG. 1 illustrates a system environment that is suitable for implementing common image window hardware within an EP (electrophotographic) process printing device.

FIG. 1 illustrates a system environment that is suitable for implementing common image window hardware within an EP (electrophotographic) process printing device. The system 100 of FIG. 1 includes printing device 102 operatively coupled to a host computer 104 through a direct or network connection 106. The direct or network connection 106 can include, for example, a printer cable, a LAN (local area network), a WAN (wide area network), an intranet, the Internet, or any other suitable communication link. This disclosure is applicable to various types of printing devices 102 (printers) capable of implementing an EP printing process for rendering PDL (page description language) data in printed form on a print medium. Therefore, printer 102 can include devices such as laser-based printers, multifunction peripheral devices and other EP-capable printing devices.

Host computer 104 can be implemented as a variety of general purpose computing devices including, for example, a personal computer (PC), a PDA (personal digital assistant), a workstation, a server, a Web server, and other devices configured to communicate with printing device 102. Host computer 104 typically provides a user with the ability to manipulate or otherwise prepare in electronic form, an image or document to be rendered as an image that is printed or otherwise formed onto a print medium by printing device 102 after transmission over network 106. In general, host computer 104 outputs host data to printing device 102 in a driver format suitable for the device 102, such as PCL (printer control language) or PostScript. Printing device 102 converts the host data and outputs it onto an appropriate recording media, such as paper or transparencies.

Exemplary Embodiment of a System for Implementing Common Image Window Hardware

Figure 2:
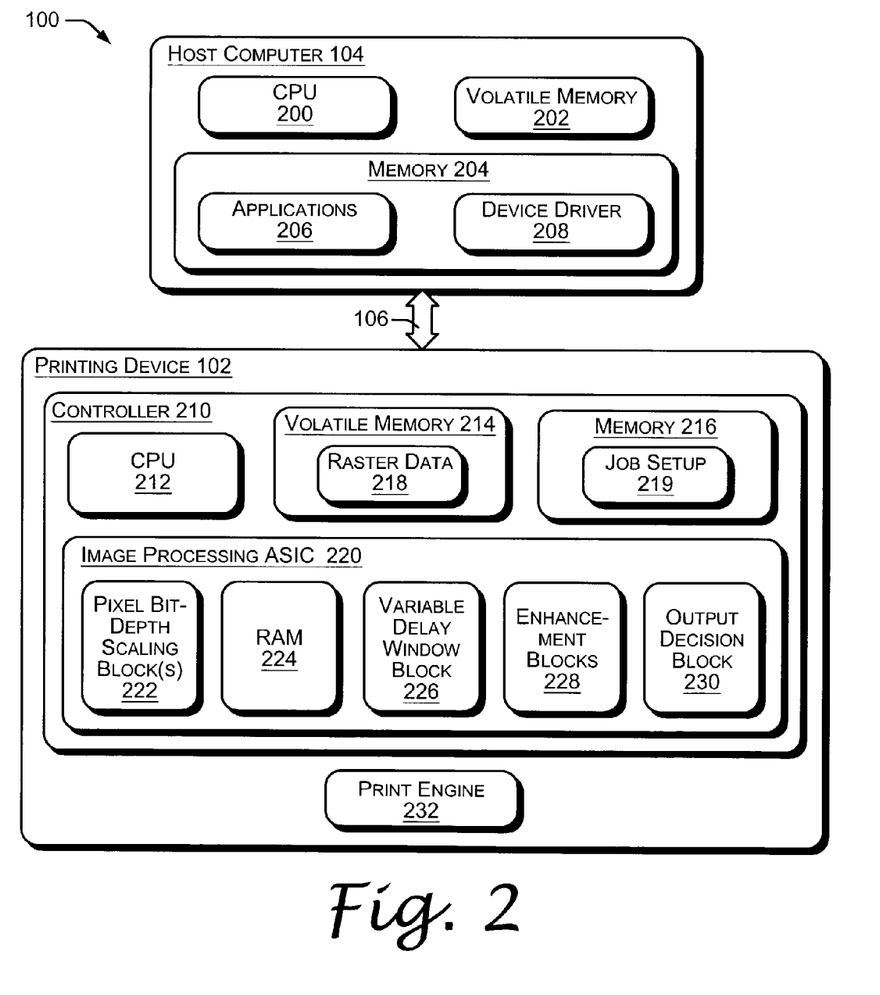
FIG. 2 is a block diagram illustrating an exemplary embodiment of a host computer and printing device such as those shown in the system environment of FIG. 1.

FIG. 2 illustrates in block diagram form, an exemplary embodiment of a host computer 104 and printer 102 such as those shown in the system environment of FIG. 1.

Host computer 104 includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer/processor-readable instructions, data structures, program modules and other data for host computer 104. Host computer 104 may implement various application programs 206 stored in memory 204 and executable on processor 200 to create or acquire a document or image (e.g., text and graphics) displayable on a computer screen and transferable to printer 102 for producing a hard copy of the document/ image. Such applications 206 might include software programs implementing word processors, illustrators, spread sheets, browsers, computer-aided design tools and the like. Host computer 104 may also implement one or more software-based device drivers 208 stored in memory 204 and executable on processor 200 to format document data into a PDL (page description language) such as PostScript or PCL (printer control language) or another appropriate format which it outputs to printer 102. Such device drivers 208 can also be implemented on the specific device they are "driving", such as on printer 102.

Printer 102 has a controller 210 that processes data from host computer 104. The controller 210 typically includes a data processing unit or CPU 212, a volatile memory 214 (i.e., RAM), and a nonvolatile memory 216. Volatile memory 214 is illustrated as including raster data 218. Raster data 218 is the rasterized form of print job data received from host computer 104 that is processable by image processing ASIC (application specific integrated circuit) 220 for rendering onto a print medium through print engine 232. Raster data 218 and its processing and rendering by ASIC 220 and print engine 232, respectively, are discussed more fully herein below. Nonvolatile memory 216 can include various computer storage media such as ROM, flash memory, a hard disk, a removable floppy disk, a removable optical disk and the like. Nonvolatile memory 216 generally provides storage of computer/processor-readable instructions, data structures, program modules and other data for printing device 102. Accordingly, memory 216 includes job setup module 219. Job setup module 219 is generally configured to execute with each print job received by printer 102 and make storage mode settings for ASIC 220 as discussed more fully below.

Image processing ASIC 220 on controller 210 includes various hardware blocks 222–230. Hardware blocks 222–230 are blocks of logic gates within ASIC 220 configured to implement various processing and storage functions in real time. The general process for the design and manufacture of such hardware blocks is well-known to those skilled in the art of ASIC development.

Brief Description of Print Process

Figure 3:
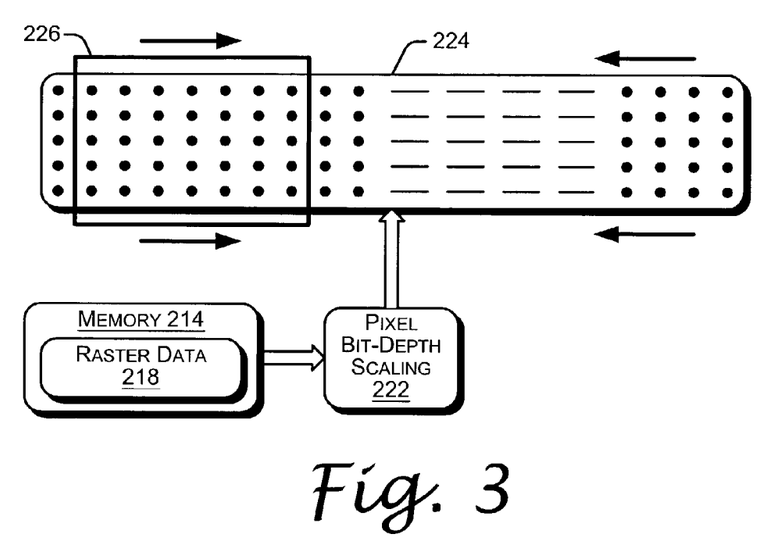
FIG. 3 illustrates a partial process of storing raster data into a RAM and a delay window on a printing device such as that shown in the system environment of FIG. 1.
Figure 4:
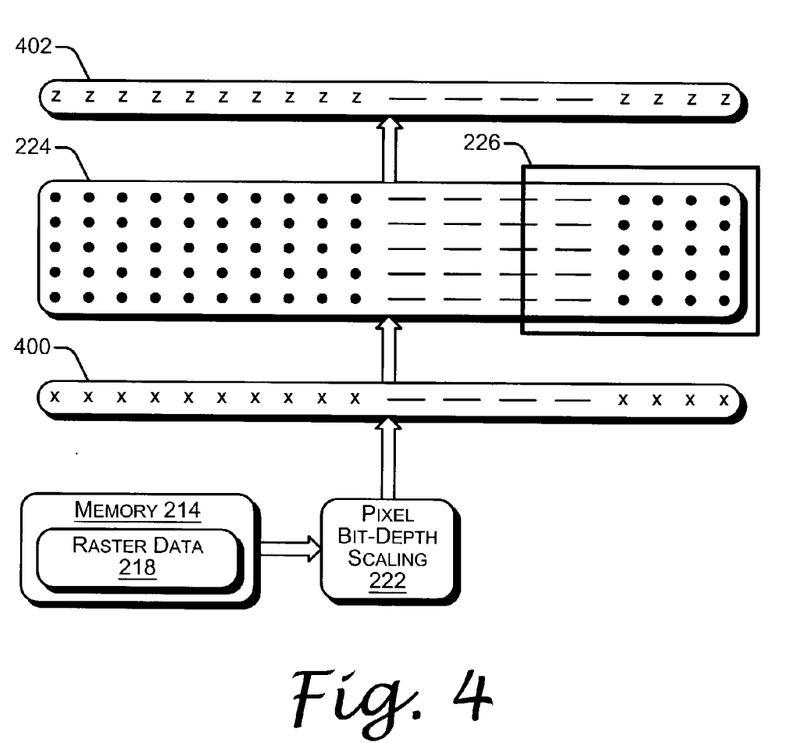
FIG. 4 illustrates additional details of the partial process of storing raster data shown in FIG. 3.

A brief description of a print process within printer 102 will now be provided with primary reference to FIGS. 2, 3 and 4. The description will be helpful in understanding the discussion of the individual components of ASIC 220 provided below.

A print job is received by printer 102 and stored as raster data 218. As discussed more fully below, job setup module 219 executes upon receipt of the print job to make storage mode settings for ASIC 220. Generally, the storage mode settings include the setting of selection bits on ASIC 220 that control window view offsets within delay window 226, delay window 226 size, whether or not more than one line of raster data 218 is read in from memory 214 concurrently, and the resolution and bit depth of pixel data in delay window 226. Raster data 218 is read from memory 214 into ASIC 220 and scaled by pixel bit depth scaling block 222. FIG. 3 shows scaled raster data being stored in RAM 224 and the delay window 226 concurrently. The RAM 224 stores a number of full lines of raster data 218 while the delay window 226 stores only a partial number of columns of the raster data 218 stored in RAM 224.

The delay window 226 is a two-dimensional pixel array that temporarily stores pixel data (i.e., raster data) while various image enhancement blocks 228 implement image processing algorithms on the pixel data. Although the delay window 226 is illustrated throughout as having the same number of rows as there are lines in the RAM 224, delay window 226 might also include additional rows of data. Thus delay window 226 might be "taller" than RAM 224 in rows of data, but it is not as "wide" as RAM 224 in columns of data. Delay window 226 typically stores on the order of 10 rows of pixels by 10 columns of pixels.

The solid arrows in FIG. 3 are intended to indicate that the raster data lines in RAM 224 shift through delay window 226, column by column. The delay window 226 effectively traverses its way over all the pixel data in the RAM 224 as each column of data shifts into the window 226 and then out of the window 226. The view of the raster data as it shifts through window 226 is presented to one or more enhancement blocks 228 (FIG. 2). The enhancement blocks 228 are configured to process the data into codes that drive one or more lasers in print engine 232 (FIG. 2). Output decision block 230 (FIG. 2) examines the raster data as it shifts through window 226 and determines which enhancement block 228 output will be used to drive the laser(s).

FIG. 4 is intended to illustrate that once all the columns of raster data lines in RAM 224 have been shifted through delay window 226, a new line of raster data 218 shifts into RAM 224 replacing the oldest line. Concurrently, a partial line, or row, of the old raster data shifts out of delay window 226 and a partial line, or row, of the new line of raster data 218 shifts into delay window 226. Thus, raster data line 400 illustrates a new line/row of raster data 218 (pixels shown as "X"s) being shifted concurrently into RAM 224 and delay window 226. At the same time, raster data line 402 represents an old line/row of raster data 218 (pixels shown as "Z"s) being shifted concurrently out of RAM 224 and delay window 226. Once the old raster line 402 is replaced with the new raster line 400, the process of shifting all the raster data through window 226, column by column, begins again. In this manner, entire pages of raster data are processed through ASIC 220 and rendered on a print medium through print engine 232.

Although the figures (e.g., FIGS. 4 and 7) and their relevant discussion generally indicate that entire new lines of raster data 218 shift into RAM 224 replacing older lines once delay window 226 "traverses" RAM 224, this is not intended to limit the manner by which data shifts in and out of RAM 224 and delay window 226. For example, a partial row or line of raster data 218 can also be continually shifted into RAM 224 as soon as, or at the same time as, a new column of data shifts into delay window 226.

Delay Window Storage Mode

A delay window 226 storage mode setting is made by job setup module 219 for each print job received by printer 102. Job setup module 219 sets storage modes through selection bits set within ASIC 220. The storage mode includes general size and data format configurations for the delay window 226 and RAM 224. Job setup module 219 makes the storage mode settings based on the print engine 232 configuration and data format variables. Print engine configuration variables include the number of laser beams and the native resolution of the engine 232. Data format variables include the resolution and bit depth of the incoming raster data 218. Therefore, for each print job, job setup module 219 examines the data format of the print job and accesses print engine 232 configuration information in order set the delay window storage mode.

The storage mode set by job setup module 219 for the delay window 226 defines the number of concurrent lines to be read into the ASIC 220, which is equivalent to the lines-per-pass or lines consumed by the print engine 232 with each pass of the laser(s). The storage mode further defines line offsets for different views within the window 226, the size of the window 226 in rows and columns of pixels, and the resolution and bit depth of pixel data in delay window 226. As discussed below, the storage mode may also choose between enhancement blocks 228 having similar functions and may limit the selection process for output decision block 230 to a subset group of enhancement blocks 228.

Scaling Pixel Bit Depth

Referring now to FIG. 2, the pixel bit depth scaling block 222 in ASIC 220 implements an algorithm that converts the bit depth of incoming raster data 218 into a bit depth that matches a target bit depth of the data to be presented in the delay window 226. The target bit depth is typically the largest bit depth required by any of the implemented enhancement blocks 228. The conversion might also be made using a look-up table rather than by using an algorithm.

Figure 5:
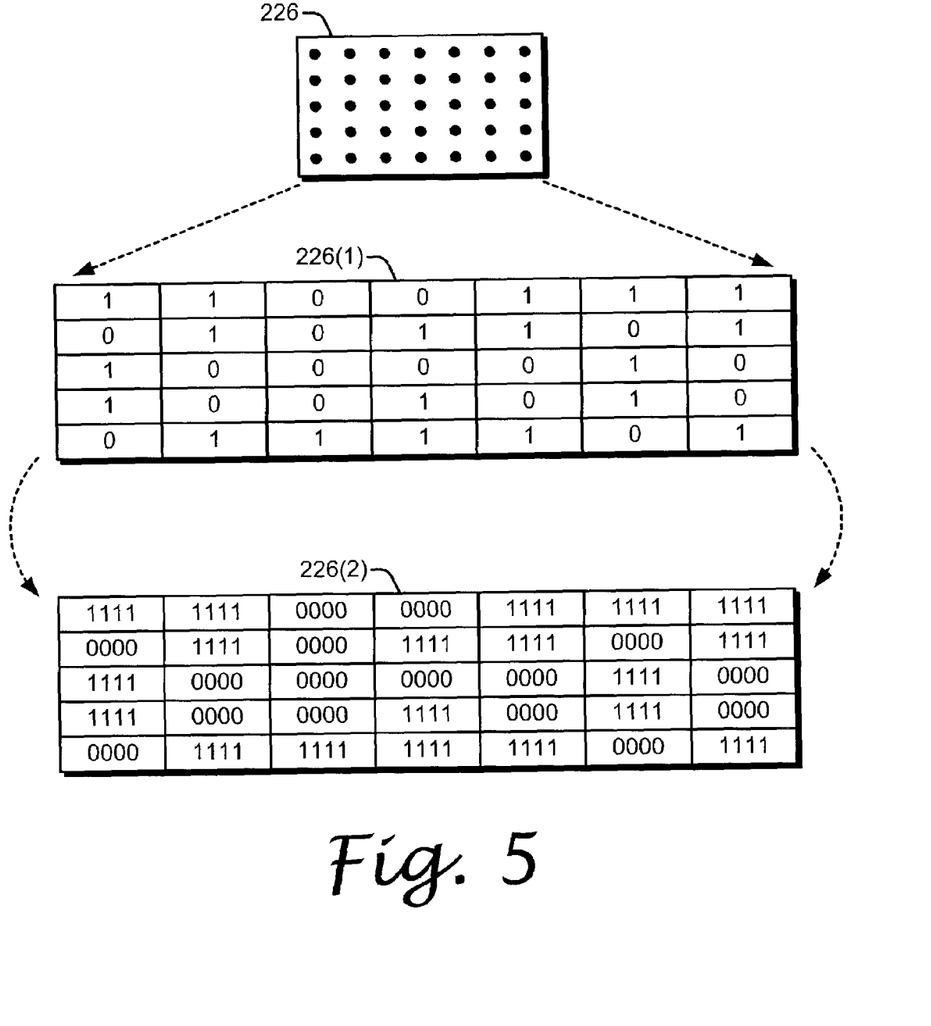
FIG. 5 illustrates an example of a delay window presenting a two-dimensional view of pixel data in a scaled and an un-scaled format.

An example of a simple algorithm that might be implemented by pixel bit depth scaling block 222 is one that duplicates bits of a lower bit depth to a higher target bit depth. Thus, duplicating 1 bit-per-pixel data in 4 locations converts the 1 bit-per-pixel data into 4 bit-per-pixel data. FIG. 5 illustrates an example of a delay window 226 presenting a two-dimensional view (5 rows by 7 columns) of pixel data. Delay window 226(1) shows pixels with a 1 bit-per-pixel bit depth that have not been scaled up by bit depth scaling block 222. Delay window 226(2) shows the same pixels after they have been scaled up to a target bit depth of 4 bits-per-pixel by bit depth scaling block 222. FIG. 5 is intended to illustrate how single bit depth data will appear in a delay window 226 if in one instance it is not scaled up, as in window 226(1), and in another instance it is scaled up to a target bit depth of 4 bit-per-pixel bit depth by scaling block 222, as in window 226(2). It is likely, however, that a target bit depth will be greater than a single bit-per-pixel value, so a single bit depth window such as window 226(1) is unlikely. As an additional example of duplicating bits of a lower bit depth to a higher bit depth, if a 2 bit-per-pixel input value is 01 binary (or 1 hexadecimal), then a target 8 bit-per-pixel for the delay window 226 would be 01010101 binary (or 55 hexadecimal). The pixel bit depth scaling block 222 performs the bit depth conversion for each line of raster data 218 read into ASIC 220 before the raster data is stored in the delay window 226.

The purpose of the scaling is to ensure that incoming raster data 218 represents (within the delay window 226) an accurate value, concurrently, for both single bit-per-pixel enhancement blocks 228 such as REt and ResDoubling, and multiple bit-per-pixel enhancement blocks 228 such as PhotoTone. The pixel bit depth scaling block 222 scales incoming raster data 218 up to a target bit depth that meets the maximum bit depth requirement of any of the implemented enhancement blocks 228. Thus, single bit depth raster data 218 may be scaled up to multiple bit depth data in order to satisfy both single bit and multi-bit requirements of the various enhancement blocks 228. The bit depth requirements for various enhancement blocks 228 are outlined herein below in Tables 1–4.

Intermediate Bit Depth Scaling for Efficient RAM Storage

In addition to scaling incoming raster data 218 to a target bit depth for presentation in delay window 226, the raster data 218 is often scaled in an intermediate step before being stored in RAM 224. Generally, raster data 218 is scaled and stored concurrently into delay window 226 and RAM 224. However, because the pixel bit depth scaling block 222 often scales incoming raster data 218 up to a target bit depth that meets the maximum bit depth requirement of any of the implemented enhancement blocks 228, the amount of memory space needed in RAM 224 to store the scaled-up raster data 218 would increase.

Scaling up the data and then storing it in RAM 224 would not be an efficient use of RAM 224. Therefore, the data being stored into RAM 224 undergoes an additional step of scaling unless the input bit depth is the same as the target bit depth. The scaling of data into RAM 224 scales data down to reduce the amount of memory space in RAM 224 required for storage. If the input bit depth is already the same as the target bit depth, then data being stored in RAM 224 is not scaled down. Prior to shifting the data stored in RAM 224 into the delay window 226, data that has been scaled down to RAM 224 is scaled back up to the target bit depth that meets the maximum bit depth requirement of any of the implemented enhancement blocks 228. Because the raster data is often initially scaled up by the pixel bit depth scaling block 222, scaling the data down to increase RAM 224 storage efficiency does not reduce the information content of the incoming raster data 218.

Image Enhancement Blocks

The enhancement blocks 228 in ASIC 220 generally implement various image processing algorithms in conjunction with device driver 208 or other application programs 206. The enhancement blocks 228 process raster data (i.e., pixel data) and generate pulse width modulation (PWM) codes, or Pcodes, that drive PWM circuits (i.e., laser driver circuits) in print engine 232. Pcodes define a pulse width and a horizontal location or justification of the pulse within a given pixel. Based on the Pcodes, laser driver circuits in print engine 232 are able to generate laser modulations with very fine granularity.

Enhancement blocks 228 may include, for example, one or more REt (Resolution Enhancement technology) blocks, PhotoTone blocks, Sideband blocks, ResDouble blocks, NEM (Native Enhancement Mode) blocks, JustifiedDither blocks, and the like. By way of a brief description of these enhancement blocks, REt implements an algorithm that smoothes pixel edges for binary (1 bit-per-pixel) data (i.e., only black and white data). Thus, REt typically operates with text or line data. PhotoTone is a half-toning algorithm that takes multiple bit-per-pixel data and generates halftones for images. PhotoTone determines how much of a given pixel will be created and what part of the pixel (e.g., the left, right, middle, etc.) will be created. Sideband is an alternative half-toning algorithm block. ResDouble modulates the laser in the EP process to achieve a higher horizontal and vertical engine resolution by taking in 2 lines of binary (1 bit-per-pixel) data to generate 1 line of output. NEM typically just maps pixel data (i.e., raster data) to Pcode data (discussed below), but can also perform simple edge smoothing or filter functions on pixel data. JustifiedDither is an error diffusion algorithm tuned to produce favorable output of images that have been scanned.

It is noted that the image processing algorithms implemented by enhancement blocks 228 are not limited to currently available algorithms, but include algorithms as yet to be developed. In addition, although image processing algorithms are discussed herein as being implemented exclusively by hardware enhancement blocks 228, such algorithms might also be implemented as software instructions stored in memory 216 and executable on processor 212. However, such algorithms are typically very complex algorithms that are better implemented in hardware in the interest of providing real-time processing performance.

Enhancement Blocks and Delay Window Size

As mentioned briefly above, each enhancement block 228 has a requirement for how it views raster data 218 in order to properly process the data. Therefore, raster data 218 (i.e., pixels) must be presented within the two-dimensional delay window 226 in a format that is compatible with each enhancement block 228. As discussed above, one component of that presentation format is the pixel bit depth, which the bit depth scaling block 222 ensures will be compatible with a bit depth required by any of the enhancement blocks 228. However, another component of the raster data 218 presentation format is the number of pixels presented in the two-dimensional window 226 view of the raster data 218. Thus, the size of the delay window 226 presenting the raster data 218 is also an important factor in presenting raster data 218 in a format that is compatible with each enhancement block 228.

The number of pixels presented in the two-dimensional delay window 226 (i.e., the size of the delay window 226) is important because algorithms implemented by enhancement blocks 228 typically must be able to view a number of pixels around the given pixel being processed. Therefore, the given pixel being processed is generally located at the center of a two-dimensional view of raster data 218, surrounded by other pixels that an enhancement block 228 also needs to see. Various enhancement blocks 228 require fewer or greater numbers of peripherally viewable pixels and therefore require different sized delay windows 226 in order to have appropriate views for processing the raster data 218. In order to provide a view of the raster data 218 that is compatible with the window size requirements of all the enhancement blocks 228, the delay window 226 is set to the largest size (i.e., the maximum number of rows and columns of pixel data) required by any of the enhancement blocks 228. This ensures that the delay window 226 is always large enough to accommodate all of the implemented enhancement blocks 228 in ASIC 220, while not being needlessly too large. The delay window 226 sizes for various enhancement blocks 228 are generally indicated herein below in Tables 1–4.

Print Engine Configuration and Delay Window Size and View Offsets

In addition, however, where an engine configuration includes more than a single laser beam, additional views within the delay window 226 may be required to support duplicate copies of a given enhancement block 228 being used to process data for the additional laser beam(s). The size of the delay window 226 is therefore additionally influenced by the number of "pipelines" or views being provided for the duplicate enhancement blocks 228 that are processing data for the additional laser beam(s). The delay window sizes and window view offsets for various engine configurations are generally indicated herein below in Tables 1–4.

Figure 6:
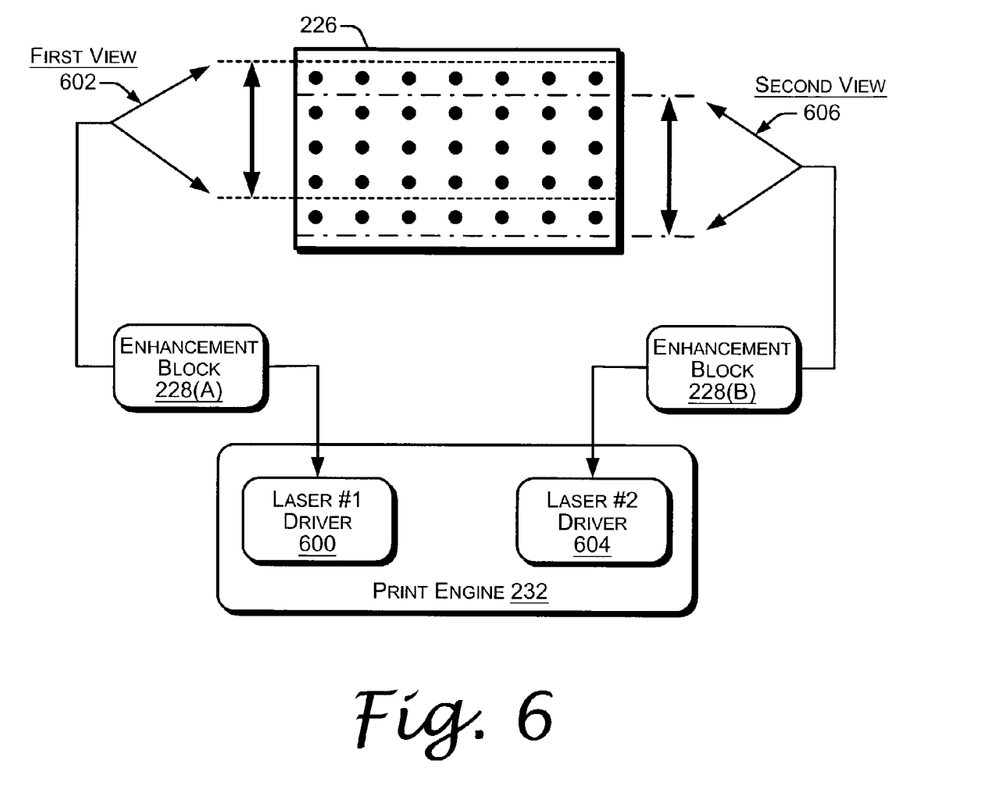
FIG. 6 illustrates an example of a delay window providing an additional view to support a print engine that has a dual laser configuration.

FIG. 6 illustrates an example of a delay window 226 with more than one view to support a print engine 232 that has a dual laser configuration. Assuming the native resolution of the print engine 232 is 600 dpi and the raster data is 600 dpi data, each time the two lasers make a scanning pass over the 600 dpi raster data, two lines of the data are consumed. Therefore, enhancement block 228(A) (e.g., a REt block) processing data for the first laser driver circuit 600, might have a first view 602 of raster data within the delay window 226 that begins at row 1 and goes to row 4. A duplicate REt enhancement block 228(B) processing data for the second laser driver circuit 604 would have a second view 606 of the raster data within the delay window 226 that begins at row 2 and goes to row 5. Since the lasers consume two lines at a time, the views 602 and 606 that support the two lasers are offset by one row within the delay window 226. Therefore, each time the lasers scan out a line of data, rather than shifting out 1 row of data, the delay window 226 shifts out two rows of data and shifts in two new rows of data. This process is illustrated by FIG. 7.

Figure 7:
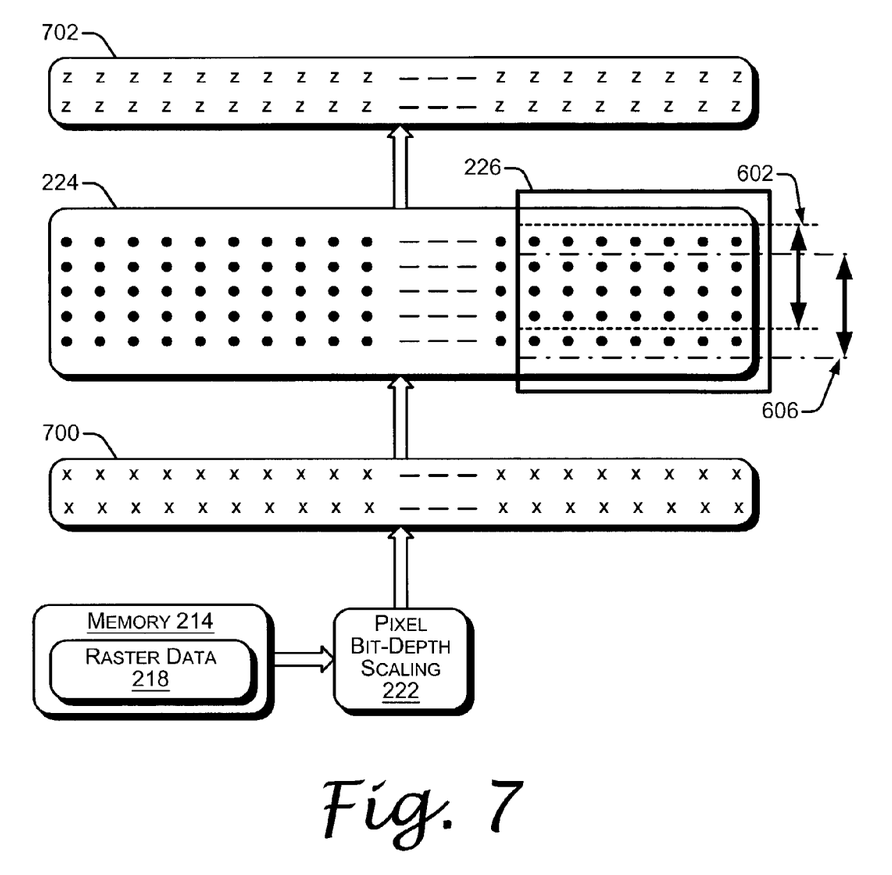
FIG. 7 illustrates a partial process for shifting data using the delay window of FIG. 6.

FIG. 7 uses raster data lines 700 to illustrate two new lines/rows of raster data 218 (pixels shown as "X"s) being shifted concurrently into RAM 224 and delay window 226. At the same time, raster data lines 702 represent old lines/rows of raster data 218 (pixels shown as "Z"s) being shifted concurrently out of RAM 224 and delay window 226. Once the old raster lines 702 are replaced with the new raster lines 700, the process of shifting all the raster data through window 226, column by column, begins again. As mentioned above with respect to FIG. 4, the process of shifting data in and out of RAM 224 and delay window 226 may occur in ways other than shifting lines of data after the delay window 226 "traverses" RAM 224. For example, partial rows of lines of raster data 218 might continually be shifted into RAM 224 as new columns of data shift into delay window 226.

It is noted that this disclosure contemplates engine configurations having various numbers of laser beams as exist on currently available EP process printers, or as may be developed in the future. Thus, engine configurations may have varying numbers of laser beams, including for example, 1, 2, 3, 4 or more laser beams.

Input and Output Data Requirements for Various Enhancement Blocks and Print Engine Configurations As mentioned above, Tables 1–4 (shown below) outline the bit depth requirements of various enhancement blocks 228, the size requirements (i.e., number of rows and columns of pixels) for the delay window 226 for the various enhancement blocks 228, and the delay window view offsets for various print engine configurations. In general, Tables 1–4 illustrate the input and output requirements of various enhancement blocks 228 based on particular laser print engine configurations.

TABLE 1

(Single Laser Beam-600 dpi Line Print Engine)

| Enhancement Block | Data Resolution (Vert. × Horiz.) (dpi) | Bit-Depth (Bits Per Pixel) | Delay Window Size (rows × columns) | Delay Window View Offset | Raster Data Lines Consumed Per Scan of Laser(s) |
|---|---|---|---|---|---|
| REt | 300 × 300 | 1 | 9 × 9 | 0 | 0.5 |
| REt | 600 × 600 | 1 | 5 × 7 | 0 | 1 |
| Sideband | 600 × 600 | 2 | 3 × 3 | 0 | 1 |
| PhotoTone | 600 × 300 | 4 | 3 × 3 | 0 | 1 |
| PhotoTone | 600 × 600 | 4 | 3 × 3 | 0 | 1 |
| ResDouble | 1200 × 1200 | 1 | 4 × 3 | 0 | 2 |
| JustifiedData | 300 × 300 | 8 | 3 × 4 | 0 | 0.5 |

TABLE 2

(Dual Laser Beam-600 dpi Line Print Engine)

| Enhancement Block | Data Resolution (Vert. × Horiz.) (dpi) | Bit-Depth (Bits Per Pixel) | Delay Window Size (rows × columns) | Delay Window View Offset | Raster Data Lines Consumed Per Scan of Laser(s) |
|---|---|---|---|---|---|
| REt | 300 × 300 | 1 | 9 × 9 | 0 | 1 |
| REt | 600 × 600 | 1 | 5 × 7 | 1 | 2 |
| Sideband | 600 × 600 | 2 | 3 × 3 | 1 | 2 |
| PhotoTone | 600 × 300 | 4 | 3 × 3 | 1 | 2 |
| PhotoTone | 600 × 600 | 4 | 3 × 3 | 1 | 2 |
| ResDouble | 1200 × 1200 | 1 | 4 × 3 | 2 | 4 |
| JustifiedDithe | 300 × 300 | 8 | 3 × 4 | 0 | 1 |

TABLE 3

(Single Laser Beam-1200 dpi Line Print Engine)

| Enhancement Block | Data Resolution (Vert. × Horiz.) (dpi) | Bit-Depth (Bits Per Pixel) | Delay Window Size (rows × columns) | Delay Window View Offset | Raster Data Lines Consumed Per Scan of Laser(s) |
|---|---|---|---|---|---|
| REt | 300 × 300 | 1 | 9 × 9 | 0 | 0.25 |
| REt | 600 × 600 | 1 | 5 × 7 | 0 | 0.5 |
| Sideband | 600 × 600 | 2 | 3 × 3 | 0 | 0.5 |
| PhotoTone | 600 × 300 | 4 | 3 × 3 | 0 | 0.5 |
| PhotoTone | 600 × 600 | 4 | 3 × 3 | 0 | 0.5 |
| ResDouble | 1200 × 1200 | 1 | 4 × 3 | 0 | 1 |
| JustifiedData | 300 × 300 | 8 | 3 × 4 | 0 | 0.25 |

TABLE 4

(Dual Laser Beam-1200 dpi Line Print Engine)

| Enhancement Block | Data Resolution (Vert. × Horiz.) (dpi) | Bit-Depth (Bits Per Pixel) | Delay Window Size (rows × columns) | Delay Window View Offset | Raster Data Lines Consumed Per Scan of Laser(s) |
|---|---|---|---|---|---|
| REt | 300 × 300 | 1 | 9 × 9 | 0 | 0.5 |
| REt | 600 × 600 | 1 | 5 × 7 | 0 | 1 |
| Sideband | 600 × 600 | 2 | 3 × 3 | 0 | 1 |
| PhotoTone | 600 × 300 | 4 | 3 × 3 | 0 | 1 |
| PhotoTone | 600 × 600 | 4 | 3 × 3 | 0 | 1 |
| ResDouble | 1200 × 1200 | 1 | 4 × 3 | 1 | 2 |
| JustifiedDith | 300 × 300 | 8 | 3 × 4 | 0 | 0.5 |

Selecting Enhancement Block Outputs to Drive Laser(s)

Figure 8:
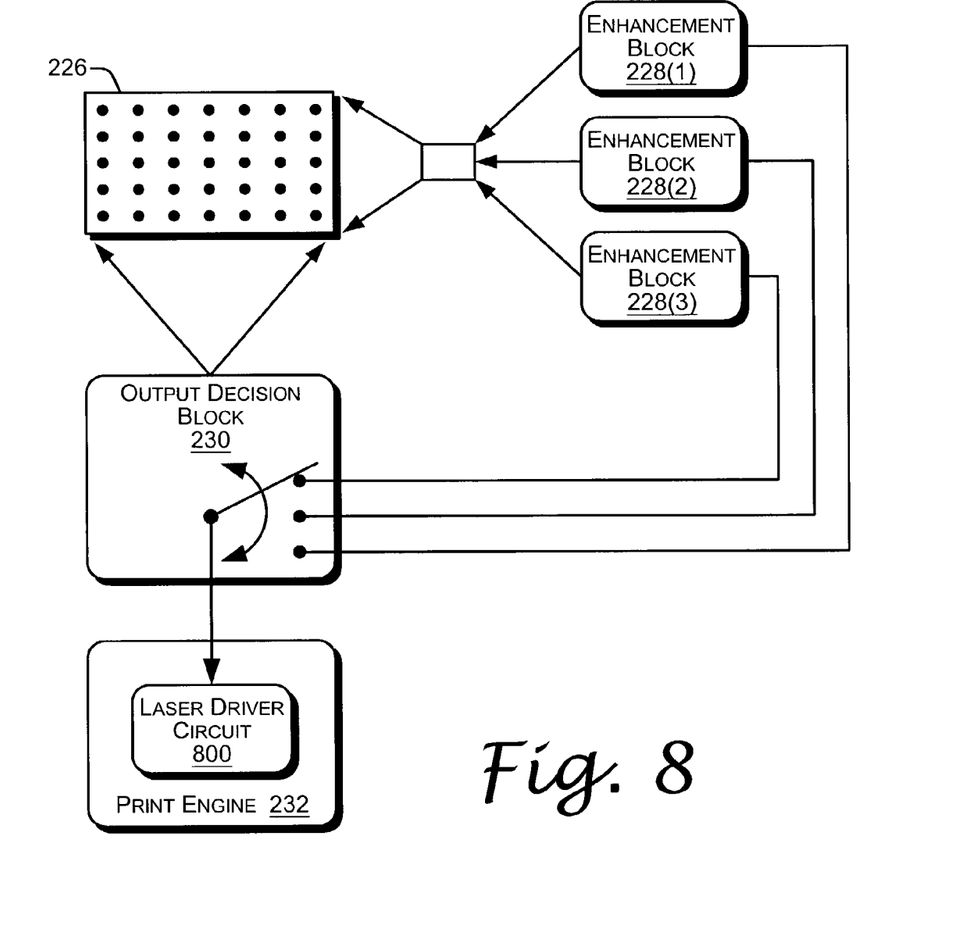
FIG. 8 is a block diagram illustrating how an enhancement block is selected to be used to drive laser(s) in a print engine.

FIG. 8 is a block diagram illustrating the general manner in which an enhancement block 228 is selected to be used to drive the laser(s) in print engine 232. The implemented enhancement blocks 228(1), 228(2), and 228(3), typically each concurrently process consistently formatted raster data from delay window 226, whether or not the data in the delay window 226 is data intended to be processed by all of the enhancement blocks 228(1), 228(2), and 228(3). For example, the data within delay window 226 may be grayscale data intended to be processed by a PhotoTone enhancement block (e.g., enhancement block 228(1)). Enhancement blocks 228(2) and 228(3), however, may be blocks that are intended for processing only black and white data, such as a REt block. In any event, each of the enhancement blocks 228(1), 228(2), 228(3) may continually process the raster data from delay window 226 as illustrated in FIG. 8 by the arrows showing that each block has the same view of the delay window 226. In addition, however, job setup module 219 may also make storage mode settings through selection bits within ASIC 220 that choose between enhancement blocks 228 with similar functions (e.g., between PhotoTone and Sideband). Job setup module 219 may also limit the selection process for output decision block 230 (see below) to a smaller subset group of enhancement blocks 228.

Output decision block 230 has a view of the data in the delay window 226 and analyzes the data to determine the data type and which enhancement block 228 output is appropriate for driving the laser driver circuit(s) 800 on print engine 232. Output decision block 230 switches between various enhancement block 228 outputs depending on the type of data being processed. Thus, if the delay window 226 data appears to be grayscale data, output decision block 230 may switch the output of a PhotoTone enhancement block (e.g., enhancement block 228(1)) to drive the laser driver circuit(s) 800 on print engine 232.

Exemplary Methods for Processing Raster Data with Common Image Window Hardware Example methods for processing raster data with common image window hardware will now be described with primary reference to FIGS. 9 and 10. The methods apply generally to the exemplary embodiments of system 100 discussed above with reference to FIGS. 1–8. The elements of the described methods may be performed by any appropriate means, such as by integrated circuit hardware blocks on an ASIC or by the execution of processor-readable instructions defined on processor-readable media, such as a disk, a ROM or other such memory device.

Figure 9:
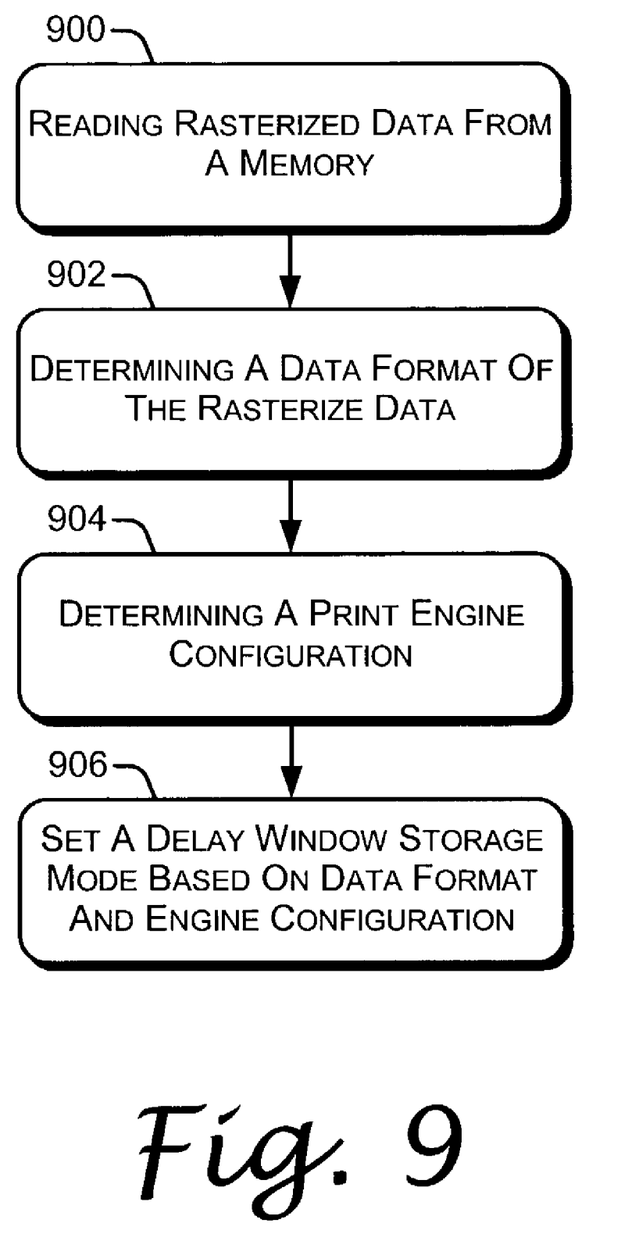
FIG. 9 is a flow diagram illustrating an example method for processing raster data on a printer with common image window hardware.
Figure 10:
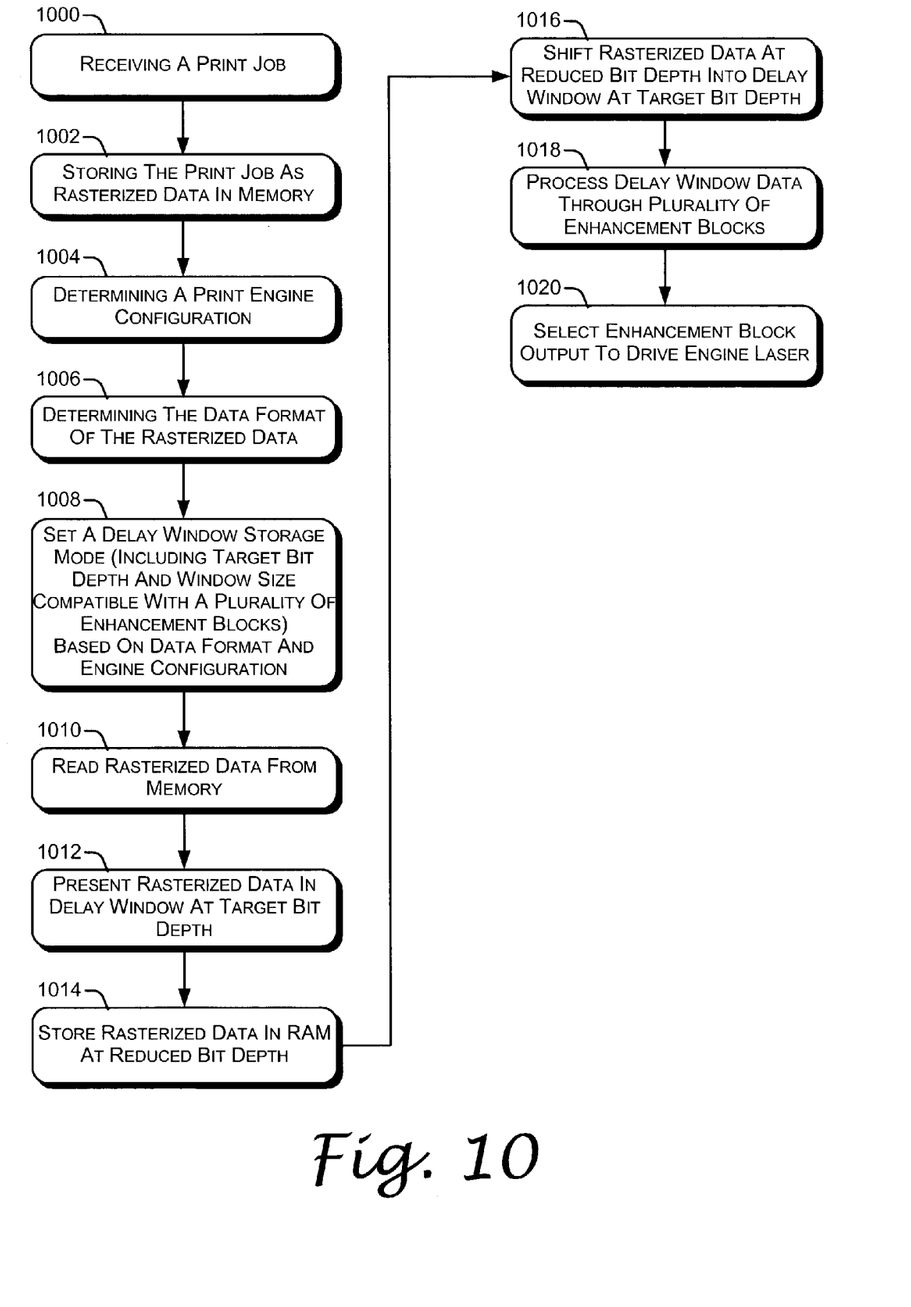
FIG. 10 is a flow diagram illustrating an additional example method for processing raster data on a printer with common image window hardware.

FIGS. 9 and 10 are flow diagrams that show examples of general methods for processing raster data with common image window hardware. Referring first to the method illustrated in FIG. 9, at block 900, rasterized data is read from a memory. At block 902, the format of the rasterized data is determined. At block 904, the configuration of a print engine is determined. At block 906, a storage mode is set for a delay window based on the data format and the engine configuration.

Referring to the method illustrated in FIG. 10, at block 1000, a print job is received. At block 1002, the print job is stored as rasterized data in a memory. At block 1004, the configuration of a print engine is determined. At block 1006, the format of the rasterized data is determined. At block 1008, a target bit depth and a window size are set in a delay window storage mode to be compatible with a plurality of implemented enhancement blocks. At block 1010, rasterized data is read from memory. At block 1012, the rasterized data is presented/stored in the delay window at the target bit depth. At block 1014, the rasterized data is stored in a RAM at a bit depth that is reduced from the target bit depth. At block 1016, the rasterized data stored in the RAM at the reduced bit depth is shifted into the delay window at the target bit depth. At block 1018, the data in the delay window is processed through the plurality of enhancement blocks. At block 1020, the output of one of the enhancement blocks is selected to drive the laser beam of a print engine.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

The invention claimed is:

1. A processor-readable medium comprising processor-executable instructions configured for:
   reading rasterized data from a memory;
   determining a data format of the rasterized data;
   determining an engine configuration of a printer engine; and
   based on the data format and the engine configuration, setting a storage mode for a delay window.

2. A processor-readable medium as recited in claim 1, wherein the setting a storage mode further comprises:
   setting a bit depth for the delay window that is compatible for use by a plurality of enhancement blocks, the plurality of enhancement blocks configured to process the rasterized data; and
   setting a delay window size that is compatible for use by the plurality of enhancement blocks.

3. A processor-readable medium as recited in claim 2, wherein the setting a delay window size further comprises:
   fixing a number of rows of pixels to be presented in the delay window; and
   fixing a number of columns of pixels to be presented in the delay window.

4. A processor-readable medium as recited in claim 1, comprising further processor-executable instructions configured for scaling the rasterized data to a target bit depth that is compatible for use by each of a plurality of enhancement blocks.

5. A processor-readable medium as recited in claim 4, comprising further processor-executable instructions configured for processing the rasterized data through the plurality of enhancement blocks.

6. A processor-readable medium as recited in claim 5, comprising further processor-executable instructions configured for:
   analyzing the rasterized data in the delay window; and
   based on the analyzing, selecting one of the plurality of enhancement blocks for output data.

7. A processor-readable medium as recited in claim 6, comprising further processor-executable instructions configured for:

generating pulse width modulation codes from the output data; and driving a laser wit the pulse width modulation codes.

8. A processor-readable medium as recited in claim 1, wherein the engine configuration comprises a plurality of lasers, the setting a storage mode further comprising providing a different view of the delay window for each laser in the engine configuration.

9. A processor-readable medium as recited in claim 8, wherein the providing a different view further comprises offsetting each view from one another by a vertical line offset within the delay window.

10. A processor-readable medium as recited in claim 1, wherein the data formation comprises a data resolution and the engine configuration comprises a number of lasers and a native resolution, the processor-readable medium comprising further processor-executable instructions configured for:

consuming an amount of rasterized data dining each pass of the number of lasers, the amount based on the data resolution, the number of lasers, and the native resolution.

11. A processor-readable medium as recited in claim 1, comprising further processor-executable instructions configured for:

scaling the rasterized data to target bit depth data;

storing the target bit depth data in the delay window;

scaling the target bit depth data to a storage-efficient bit depth data; and storing the storage-efficient bit depth data in a RAM (random access memory).

12. A processor-readable medium as recited in claim 11, comprising further processor-executable instructions configured for:

accessing the storage-efficient bit depth data from the RAM; and storing the storage-efficient bit depth data in the delay window after re-scaling the storage-efficient bit depth data to target bit depth data.

13. An ASIC (application specific integrated circuit) comprising hardware blocks configured for:

reading rasterized data from a memory;

determining a data format of the rasterized data;

determining an engine configuration of a printer engine; and based on the data format and the engine configuration, setting a storage mode for a delay window.

14. An ASIC as recited in claim 13, wherein the setting a storage mode further comprises:

setting a bit depth for the delay window tat is compatible for use by a plurality of enhancement blocks, the plurality of enhancement blocks configured to process the rasterized data; and setting a delay window size that is compatible for use by the plurality of enhancement blocks.

15. An ASIC as recited in claim 13, wherein the setting a delay window size further comprises:

fixing a number of rows of pixels to be presented in the delay window; and fixing a number of columns of pixels to be presented in the delay window.

16. An ASIC as recited in claim 13, wherein the hardware blocks are further configured for scaling the rasterized data to a bit depth that is compatible for use by each of a plurality of enhancement blocks.

17. An ASIC as recited in claim 16, wherein the hardware blocks are further configured for processing the rasterized data through the plurality of enhancement blocks.

18. An ASIC as recited in claim 17, wherein the hardware blocks are further configured for:

analyzing the rasterized data in the delay window; and based on the analyzing, selecting one of the plurality of enhancement blocks for output data.

19. An ASIC as recited in claim 18, wherein the hardware blocks are further configured for:

generating pulse width modulation codes from the output data; and driving a laser with the pulse width modulation codes.

20. An ASIC as recited in claim 13, wherein the engine configuration comprises a plurality of lasers, the setting a storage mode further comprising providing a different view of the delay window for each laser in the engine configuration.

21. An ASIC as recited in claim 20, wherein the providing a different view further comprises offsetting each view from one another by a vertical line offset within the delay window.

22. An ASIC as recited in claim 13, wherein the data format comprises a data resolution and the engine configuration comprises a number of lasers and a native resolution, the processor-readable medium comprising further processor-executable instructions configured for:

consuming an amount of rasterized data during each pass of the number of lasers, the amount based on the data resolution, the number of lasers, and the native resolution.

23. An ASIC as recited in claim 13, wherein the hardware blocks are further configured for:

scaling the rasterized data to target bit depth data;

staring the target bit depth data in the delay window;

scaling the target bit depth data to a storage-efficient bit depth data; and storing the storage-efficient bit depth data in a RAM (random access memory).

24. An ASIC as recited in claim 23, wherein the hardware blocks are further configured for:

accessing the storage-efficient bit depth data from the RAM; and storing the storage-efficient bit depth data m the delay window after re-scaling the storage-efficient bit depth data to target bit depth data.

25. A method of processing data on a printer comprising:

reading rasterized data from a memory;

determining a data format of the rasterized data;

determining an engine configuration of a printer engine; and based on the data format and the engine configuration, setting a storage mode for a delay window.

26. A method as recited in claim 25, wherein the setting a storage made further comprises:

setting a target bit depth for the delay window that is compatible for use by a plurality of enhancement blocks;

setting a delay window size that is compatible for use by a plurality of enhancement blocks configured to process the rasterized data; and setting a different view of the delay window for each laser in the engine configuration.

27. A method as recited in claim 26, wherein the setting a delay window size further comprises:

fixing a number of rows of pixels to be presented in the delay window; and fixing a number of columns of pixels to be presented in the delay window.

28. A method as recited in claim 25, further comprising:
scaling the rasterized data to target bit depth data;
storing the target bit depth data in the delay window;
scaling the target bit depth data to a storage-efficient bit depth data; and
storing the storage-efficient bit depth data in a RAM (random access memory).

29. A method as recited in claim 28, further comprising:
accessing the storage-efficient bit depth data from the RAM; and
storing the storage-efficient bit depth data in the delay window after re-scaling the storage efficient bit depth data to target bit depth data.

30. A printer comprising:
means for reading rasterized data from a memory;
means for determining a data format of the rasterized data;
means for determining an engine configuration of a printer engine; and
means for setting a storage mode for a delay window based on the data format and the engine configuration.

31. A printer as recited in claim 30, wherein the means for setting a storage mode further comprises:

means for setting a size for the delay window to a largest size required by any of a plurality of implemented enhancement blocks; and means for presenting the rasterized data in the delay window at a target bit depth that is the deepest bit depth required by any of the plurality of implemented enhancement blocks.

32. A printer as recited in claim 31, further comprising:

means for analyzing the rasterized data in the delay window; and means for determining, based on the analyzing, an output of one of the plurality of enhancement blocks from which to develop processed data.

33. A printer as recited in claim 32, further comprising:

means for generating pulse width modulation codes from the processed data; and means for driving a laser with the pulse width modulation codes.

* * * * *

UNITED STATES PATENT AND TRADEMARK OFFICE
CERTIFICATE OF CORRECTION

PATENT NO. : 7,142,316 B2
APPLICATION NO. : 10/150804
DATED : November 28, 2006
INVENTOR(S) : Eugene A. Roylance et al.

It is certified that error appears in the above-identified patent and that said Letters Patent is hereby corrected as shown below:

In column 15, line 3, in Claim 7, delete "wit" and insert -- with --, therefor.

In column 15, line 14, in Claim 10, delete "formation" and insert -- format --, therefor.

In column 15, line 18, in Claim 10, delete "dining" and insert -- during --, therefor.

In column 15, line 49, in Claim 14, delete "tat" and insert -- that --, therefor.

In column 16, line 32, in Claim 23, delete "staring" and insert -- storing --, therefor.

In column 16, line 41, in Claim 24, after "data" delete "m" and insert -- in --, therefor.

In column 16, line 52, in Claim 26, delete "made" and insert -- mode --, therefor.

In column 17, line 12, in Claim 29, delete "storage efficient" and insert -- storage-efficient --, therefor.

Signed and Sealed this

Eighteenth Day of August, 2009

David J. Kappos
*Director of the United States Patent and Trademark Office*